Aug. 13, 1968    N. WORKMAN ET AL    3,396,876
LIQUID FOOD CONTAINER
Filed May 6, 1966

INVENTORS
C. W. Wilson
N. Workman
*Levit Musegades*
George Douglas Jr.
ATTORNEYS United States Patent Office 3,396,876
Patented Aug. 13, 1968

3,396,876
LIQUID FOOD CONTAINER
Norman Workman and Clayton W. Wilson, both of Box 321, Rte. 2, South Point, Ohio 45680
Filed May 6, 1966, Ser. No. 548,213
7 Claims. (Cl. 222—474)

ABSTRACT OF THE DISCLOSURE

Basically, the invention comprises a body portion for holding a liquid, a rim threadably attached to the body portion, a vertically movable sealing lid in the rim, a spring for biasing the lid downwardly against the rim, and means contained in the body portion for raising the lid. The rim and body portions of the invention are separable so that the invention may be easily cleaned. The bottom of the body portion is recessed and the lower periphery of the body is provided with a layer of resilient, sponge-like material to prevent the invention from slipping upon a slick surface on which it might be placed. Finally, the side walls and body portion may be insulated so as to maintain an even temperature in a hot or cold liquid carried by the invention.

---

This invention relates to portable containers, and more particularly to an improved, portable liquid container which also serves as a drinking cup.

The invention has utility as a transporter for liquid beverages, such as coffee, tea, milk or soft drinks, or liquid food such as soups, broths, etc., is provided with means for sealing the container, and may be used as a drinking cup for consuming the contents directly from the invention. The user of the invention may carry liquid refreshment in the invention when he takes a trip in a private automobile, or on a plane, bus or train, when he goes to a stadium or arena to witness sports events, or when he just wishes to relax in his own yard with a handy beverage nearby.

Further and more complete objects and advantages of the invention may be had by reference to the following specification and drawings in which.

Figure 1:
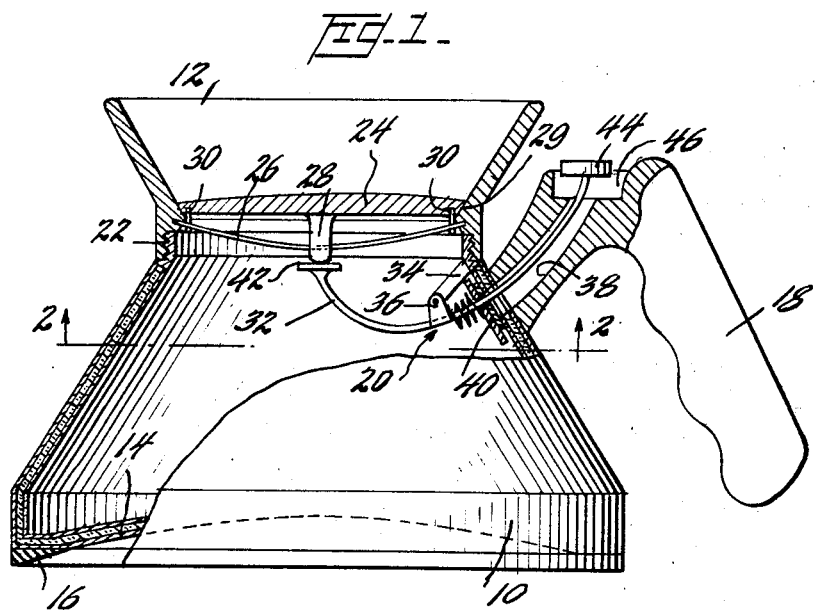
FIGURE 1 is an elevational view of the invention, partially in section to show interior detail of the invention.
Figure 2:
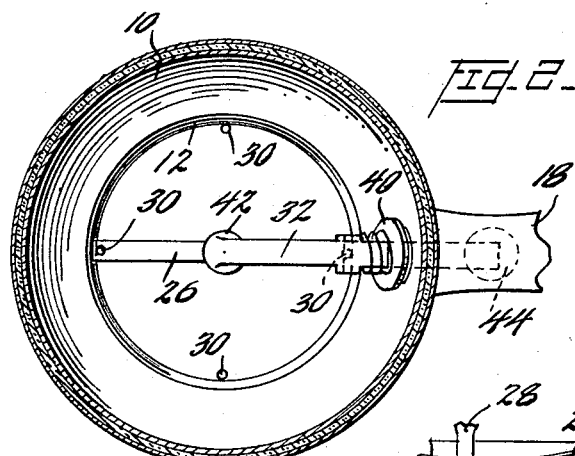
FIGURE 2 is a sectional view, taken along lines 2—2 of FIGURE 1.

Referring now to the drawings by reference character, the invention is shown in FIGURE 1 comprising a body portion 10 and a rim element 12. Body 10 may be provided with a recessed bottom 14 to prevent damage by marring or condensation on the surface upon which the invention might rest, and bottom 14 might further be provided with a resilient rim 16 to prevent the invention from sliding on a supporting surface. Body 10 includes a graspable handle 18, mounted on a side wall thereof, and operating means 20 to exert an upward force at the approximate top center of body 10. Rim 12 may be secured in removable, sealing engagement with body 10 by any suitable means, such as by being threadably received on body 10 as indicated at 22. A lid 24 is secured in rim 12 by means of a leaf spring 26, mounted in the lower interior walls of rim 12, across a diameter of rim 12, and through a stud 28 which depends from the center of lid 24. The exterior sides of the lid 24 and the interior of the rim 12 are slanted so as to form a seat 29 for the lid 24 in rim 12. As shown in FIGURE 2, a plurality of equi-spaced guides 30 may be mounted in rim 12 to assure vertical movement of lid 24 to an open position with respect to rim 12.

From the description thus far, it can be seen that lid 24 may be moved vertically within rim 12 by applying a force to the bottom of stud 28, as the lid 24 is biased downwardly to a closed position by action of leaf spring 26.

The means for opening and closing lid 24 is secured entirely within body 10 and includes, in the preferred form of the invention, a lever 32, a mount 34 providing fulcrum 36 for lever 32, a cavity 38 within handle 18, allowing play of lever 32 therein, and a slidable, spring-biased liquid seal 40, which serves to prevent entry of liquid from body 10 into cavity 38. The working end of lever 32 is formed into a disc surface 42, which is adapted to contact the base of stud 28 when rim 12 is engaged on body 10 as shown in FIGURE 1. The other end of lever 32 terminates in a button 44 which may be finger or thumb depressed to effect an opening of lid 24 through upward force of disc 42 supplied by pivoting of lever 32 about its fulcrum 36. A recess 46 may be formed in the top of handle 18 about button 42 to prevent accidental depression of button 44 and consequent opening of lid 24 when such is not desired.

Figure 4:
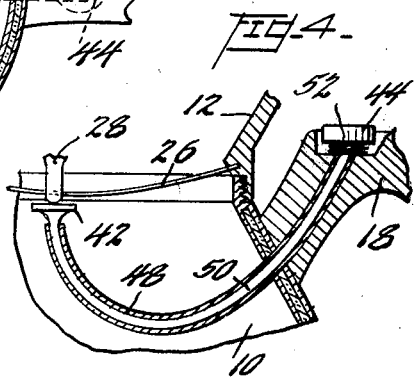
FIGURE 4 is a partial sectional view, similar to FIGURE 1, but showing an alternative operative means in the body for opening and closing the lid in the rim of the invention.
Figure 3:
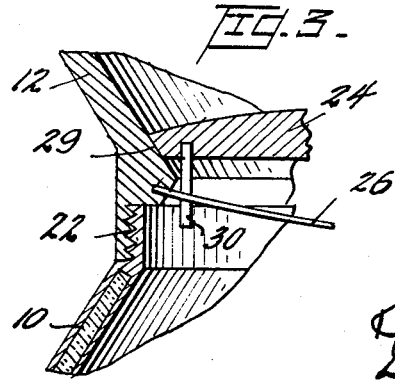
FIGURE 3 is a detail view of the upper, left hand portion of FIGURE 1, drawn to an enlarged scale.

An alternative means for applying the force to the bottom of stud 28 to open lid 24 is illustrated by FIGURE 4. In this embodiment, a stiff, hollow tube 48 is mounted in body 10, terminating beneath stud 28, and extending through handle 18 to recess 46. A somewhat flexible rod insert 50 is mounted within tube 48, and is slidable therein by depression of button 44 to exert a force on disc 42 and thus effect an opening of lid 24 in the manner described above. If desired, a compression spring 52 may be mounted beneath button 44 to assist in moving the flexible rod 50 to a normal position when button 44 is released. In this embodiment, the need for a seal 40 is dispensed with, as hollow tube 48 may be mounted in sealed relationship with handle 18. Leakage of liquid from body 10 is also minimized, due to the relatively close fit of rod 50 in tube 48.

The operation of the invention is relatively simple. A supply of liquid may be placed within body 10 by removing rim 12 from body 10. Once the rim is replaced on the body, the liquid will be tightly sealed within the invention due to the effect of spring 26 biasing lid 24 to a closed position. The device may be used as a drinking cup by merely depressing button 44, thereby opening lid 24 in the manner hereinbefore described and thereby allowing liquid to pass between lid 24 and the interior wall of rim 12. Once button 44 is released, lid 24 will move to a closed, sealed position with respect to rim 12 by action of spring 26.

It is readily apparent from the foregoing that I have invented a new and highly useful device in the art of portable liquid containers, and thus I am not to be limited to the exact construction as hereinbefore provided, except as may be deemed to be within the scope of the following claims.

We claim:

1. A portable liquid container having a single opening at the top for dispensing and venting comprising a body portion for the liquid, a rim for said body, first means on said body and second, cooperating means in said rim for opening and closing said container, said first means including operative means mounted through a side wall of said body, adapted to exert an upward force at the approximate top center of said body portion, a liquid seal between the side wall and said operative means, said second means comprising a downwardly biased, vertically movable lid element and a stud element, depending from said lid, and adapted to contact said operative means, and a seat in said rim to receive said downwardly biased lid element, said first means comprising a handle, mounted externally on said body and means defining a cavity internally of said handle and through a side wall of said body, said operative means comprising a lever, pivotally mounted internally of said body and extending through said handle, and a thumb depressable button on the end of said lever extending through said handle, the other end of said lever terminating at said approximate top center of the body.

2. The devices of claim 1 wherein said body portion is in the form of an inverted, truncated cone, having a recessed bottom portion.

3. The device of claim 2 wherein the periphery of the bottom edge about said bottom portion is provided with a resilient, sponge-like support rim, the side walls of said body portion including insulation means.

4. The device of claim 1 wherein said handle includes means defining a recess about said thumb-depressable button to prevent accidental depression of said button.

5. The device of claim 1 wherein said liquid seal includes a slidable gasket about said lever, biased outwardly against the interior of said body portion whereby a liquid seal is provided between said cavity and said body.

6. The device of claim 1 wherein said rim is in the form of an open, truncated cone, said rim being threadably received on the body, said stud element depending from the approximate center of said lid, the lid downwardly biased by means of at least one leaf spring mounted on said stud, the ends of said spring received in the interior wall of said rim, beneath said lid, and said seat for the lid being located in the lower interior periphery of said rim.

7. The device of claim 6 wherein said lid is provided with guide means cooperating with said rim to effect a substantially vertical movement of said lid in an opening and closing operation thereof.

References Cited

UNITED STATES PATENTS

| 18,546 | 11/1857 | Hebbard | 222—183 |
| 1,034,897 | 8/1912 | Fusner | 222—470 X |
| 2,258,002 | 10/1941 | De Kay | 222—470 |
| 2,496,157 | 1/1950 | Gaudino | 248—346.1 |
| 2,496,728 | 2/1950 | Laubhan | 222—470 |
| 2,501,142 | 3/1950 | Reichart | 222—470 X |
| 2,653,734 | 9/1953 | Stoker | 222—471 X |

FOREIGN PATENTS 854,334  11/1960  Great Britain.

ROBERT B. REEVES, *Primary Examiner.*

N. L. STACK, *Assistant Examiner.*